United States Patent Office 3,219,515
Patented Nov. 23, 1965

3,219,515
ADHESIVE COMPOSITIONS AND
PREPARATION THEREOF
Rip G. Rice, San Diego, Buell H. Geib, Canoga Park, and James R. Hooker, San Diego, Calif., assignors to General Dynamics Corporation, San Diego, Calif., a corporation of Delaware
No Drawing. Filed Sept. 4, 1962, Ser. No. 221,370
16 Claims. (Cl. 161—186)

This invention relates to novel adhesive compositions and to a method for preparation of such compositions. The invention is particularly concerned with production of such adhesive compositions from condensation products of phosphonitrilic halides and polyhydroxy aromatic compounds.

The production of a novel class of condensation products of cyclic phosphonitrilic halides, particularly the chloride, with polyhydroxy aromatic compounds such as hydroquinone, is described in the copending applications of Rice and Riley, Serial No. 205,222, filed June 26, 1962, and Serial No. 31,814, filed May 26, 1960, and in Rice and Riley, Serial No. 820,574, filed June 16, 1959, now abandoned.

Industry in general, and particularly the aircraft manufacturing industry, has been seeking suitable adhesives that bond metal to metal, such as in the preparation of metal-to-metal overlaps and in the preparation of honeycomb sandwich structures. Many of the adhesives developed to date for this purpose do not possess desirably high strength at ordinary temperatures, while in a great many instances adhesives which possess satisfactory strength at normal temperature, tend to lose their strength at high temperatures to which many aircraft parts are often exposed.

In the copending application, Serial No. 37,051, of Rice, Geib, Kaplan and Hooker, filed June 20, 1960, which issued as Patent No. 3,108,989 on October 29, 1963, is described an adhesive and bonding composition comprising a condensation product of a cyclic phosphonitrilic halide and a polyhydroxy aromatic compound, preferably hydroquinone, with an elastomeric conjugated diene polymer containing free carboxyl groups, particularly a carboxylated butadiene-acrylonitrile rubber, which is useful as an adhesive or bonding agent in certain particular applications, especially in the production of electrical tapes and glass fabric laminates. However, this composition does not have sufficiently high strength at normal and elevated temperatures for commercial utility in bonding metal to metal, for example, aluminum to aluminum parts, and especially as practiced in the aircraft manufacturing industry.

Thus, it is an object of the invention to provide novel adhesive compositions. It is a further object of the invention to produce a novel class of adhesive compositions based on the aforementioned condensation products of cyclic phosphonitrilic halides and polyhydroxy aromatic compounds. A further object is to provide novel adhesive compositions containing condensation products of cyclic phosphonitrilic chlorides and polyhydroxy aromatic compounds, and a carboxylated butadiene-acrylonitrile rubber. Another object is to provide novel adhesive compositions particularly adapted for bonding metals to various types of other material, and especially for bonding metal to metal, e.g., aluminum to aluminum, and particularly adhesive compositions of this type having high strength at elevated temperature, e.g. of the order of about 500° F. A still further object is the provision of an article of manufacture comprising a pair of metal parts bonded together by an adhesive composition of the aforementioned type. Yet another object is the provision of novel procedure for the preparation of the aforementioned adhesive compositions. Other objects and advantages of the invention will be apparent from the following detailed description of the invention.

It has now been found that the above and other objects of the invention may be accomplished by the provision of novel compositions comprising a mixture of (1) a condensation product of a cyclic phosphonitrilic chloride polymer, especially the trimeric or tetrameric phosphonitrilic chloride, and a polyhydroxy aromatic compound, preferably hydroquinone, (2) an elastomeric conjugated diene polymer containing free carboxyl groups, particularly a carboxylated butadiene-acrylonitrile rubber, and (3) a cross-linking agent having a functional group or groups reactive with the aromatic hydroxy groups in said condensation product, to thereby cross link said condensation product. Such agent according to the invention can be an aldehyde or an aldehyde generator such as hexamethylenetetramine, or a polyepoxide. A particularly valuable cross-linking agent of the latter type has been found to be dicyclopentadiene diepoxide.

It has been found that when such compositions are placed between two surfaces, and particularly metal surfaces, and subjected to elevated curing temperatures, high strength bonds having particularly high heat resistance, toughness and flexibility at high temperatures are formed.

It has been found also that when the above adhesive formulation of the invention is blended on a rubber mill in a manner described in detail hereinafter, an adhesive is provided having improved bond strength at elevated temperature, e.g. 500° F., as compared to adhesives produced by blending the components of the formulation in a solvent.

The condensation product or reactant (1) above employed in producing the cross linked polymeric products of the invention are preferably obtained as described in the above copending applications of Rice and Riley, by reacting under certain reaction conditions a lower cyclic phosphonitrilic chloride with a polyhydroxy aromatic compound having two or more hydroxy groups, such as hydroquinone, tetrachlorohydroquinone, biphenol - A, phloroglucinol, pyrogallol, catechol, resorcinol, toluhydroquinone, diphenolic acid, 1,4-dihydroxy naphthalene, and the 1,5- 1,6- and 1,8-isomers thereof, trihydroxynaphthalenes and the like.

The preferred polyhydroxy aromatic compounds are hydroquinone and resorcinol. These condensation products are referred to as "component (1)" hereinafter.

The cyclic phosphonitrilic chloride materials employed in producing component (1), also referred to herein as the lower cyclics, are preferably cyclic trimeric or tetrameric phosphonitrilic chloride or mixtures thereof, e.g., a mixture of about 75% trimer and 25% tetramer by weight, substantially free of linear phosphonitrilic chloride polymers, but may contain minor amounts of higher cyclics, for example, pentamer, hexamer and heptamer, totaling less than about 10% by weight of the total cyclics.

The condensation reaction for producing component (1) is preferably carried out in the presence of tertiary amine functioning to form with the HCl produced in the reaction a salt of such amine, herein referred to as the HCl acceptor, and also in the presence of a catalytic tertiary amine functioning to facilitate removal of the chlorine atoms from the phosphonitrilic chloride starting material. The catalytic tertiary amine may also act as the HCl acceptor. Examples of the tertiary amines found particularly useful as HCl acceptors include heterocyclic tertiary amines, of which pyridine has been found particularly useful. Alternatively, aliphatic tertiary amines, such as tributylamine can also be employed as HCl acceptors. The tertiary amine employed also may constitute the reaction solvent as hereinafter pointed out.

The reaction is also carried out preferably in a solvent medium. Such solvent can be a homogeneous solvent in which the reactants and the HCl acceptor are all soluble, or a heterogeneous solvent in which the phosphonitrilic chlorine and the HCl acceptor are soluble but in which the polyhydroxy aromatic compound, for example hydroquinone, is insoluble. Examples of homogeneous solvents include ethers such as dioxane, lower aliphatic nitriles such as acetonitrile, and aliphatic alcohol esters of the lower aliphatic acids such as ethyl acetate. Tertiary amines such as those noted above as HCl acceptors can also function as homogeneous solvents. Examples of heterogeneous solvents include aliphatic and aromatic hydrocarbons and chlorinated hydrocarbons such as heptane, toluene, carbon tetrachloride and chlorobenzene.

In preferred practice the amount of polyhydroxy aromatic material employed is at least 2 mols per mol of $PNCl_2$ moiety in the polyphosphonitrilic chloride, and the amount of HCl acceptor employed is sufficient to react with the HCl formed in the reaction, preferably employing in excess of 2 mols per mol of $PNCl_2$ moiety in the polyphosphonitrilic chloride.

The reaction is a substitution reaction in which most or all of the chlorine atoms of the polyphosphonitrilic chloride are replaced by residues of the polyhydroxy aromatic compound, and the reaction takes place under conditions including temperature such that the PN-containing rings of the phosphonitrilic chloride starting material are preserved in the final product. The condensation product is in the form of chains containing recurring cyclic, e.g., trimer and/or tetramer PN-containing ring nuclei or rings. The hydrogen atom of at least one of the functional hydroxy groups of the polyhydroxy aromatic compound is removed during the reaction. One or more phosphorus atoms in each PN-containing ring are linked to adjacent phosphorus atoms in adjacent PN ring nuclei through aromatic dioxy, e.g., phenylenedioxy, residue units formed by removal of the hydrogen atom of two hydroxy groups of the polyhydroxy aromatic compound. However, some of the polyhydroxy aromatic, e.g. benzenediol, residues are only partially reacted through one of the two functional hydroxy groups, the remaining hydroxy group being free and unreacted, forming aromatic oxy radicals containing free hydroxyl groups, e.g., hydroxy phenoxy radicals.

Following the reaction, the solvent is removed, e.g., by decantation, and the condensation product is precipitated and separated from the tertiary amine, tertiary amine hydrochloride and any excess polyhydroxy aromatic compound present, by treatment with water, or by the "drowning" procedure described in U.S. application Serial No. 37,466 of Lloyd A. Kaplan, filed June 20, 1960, now abandoned, to recover the condensation product, substantially free of the above materials.

The constitutional formula of the above condensation products, component (1), depending on the degree of the condensation reaction, may be represented as follows:

(I) $(P_xN_x)_nCl_m(OBO)_q(OBOH)_p$ and preferably (Ia) $(P_xN_x)_nCl_m(OC_6H_4O)_q(OC_6H_4OH)_p$ where B is a divalent aromatic radical, which may or may not contain one or more free hydroxyl groups, $P_xN_x$ is a cyclic PN ring residue, for example, a trimer or a tetramer ring

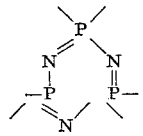

or

where $x$ is an integer in the range of 3 to 11, suitably in the range 3 to 5, $n$ is an integer of 2 or more representing the number of rings linked together by arylenedioxy, e.g., phenylenedioxy units, $m$ represents the number of chlorine atoms per mol of condensation product not removed in the dehydrohalogenation reaction, which may be as low as 0 and as high as about 60, but usually at least about 0.5. Chlorine may be present in the condensation product in an amount from 0 to 10%, usually about 0.1 to about 10% and preferably about 0.1 to about 5%, by weight of the product, $p$ is an integer equal to the number of hydroxy aryloxy, e.g., phenoxy, groups per mol present in the product, which is at least 1, and may be as high as 120, preferably about 10 to about 75, such that the hydroxyl content may be as low as about 1% and as high as about 20% by weight of the condensation product. Where dihydroxy aromatic compounds are employed such as hydroquinone, the hydroxyl content of the condensation product can be up to about 12%, usually from about 3 to about 10%, by weight of the product, and $q$ is equal to $nx - \frac{1}{2}(m+p)$, and may be less than or greater than 1, usually at least 1.

Thus, $2nx = 2q + m + p$.

The above reactions do not give a single compound, but rather a spectrum of compounds of different molecular weights in which $x$ may vary as noted above, and $n$, $m$, $p$, and $q$ may vary over a substantially wide range, and the products are mixtures of such compounds of varying chain lengths and geometries containing PN rings. The condensation product is thus an average of all of these compounds and the molecular weight, chlorine content, and OH group content as herein referred to, are the averages of all of the components of the mixture forming the product to which the above values are applied.

In the above condensation products comprising a mixture of compounds as above noted, there is present at least one, i.e., one or more linkages of the type (II) 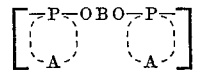

and preferably of the type (III) 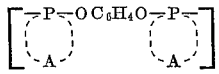

where B is a divalent aromatic radical and where A represents the atoms necessary to complete a PN ring moiety, preferably a lower cyclic PN ring moiety such as a trimeric or tetrameric PN ring as above shown, and wherein said compounds of the mixture contain substituents on the phosphorus taken from the group consisting of —Cl and —BOH (preferably —$C_6H_4OH$) groups, where B has the value noted above.

The condensation products may have molecular weights of about 1,000 to about 20,000, usually about 3,000 to about 8,000, based on the average molecular weight as determined by vapor pressure osmometry, in accordance with the procedure described by A. P. Brady, H. Huff and J. W. McBain in "Journal of Physical and Colloid Chemistry," vol. 55, page 304 (1951).

Infrared absorption spectra obtained on the condensation product of, for example, hydroquinone, and $(PNCl_2)_3$ or mixtures thereof with higher cyclics as starting material, show very strong absorption in the region of 11 to 11.5 microns, with very strong absorption maximum at about 11.3 microns, characterizing the presence of the $P_3N_3$ ring in the product. Infrared absorption maxima at about 3.0 microns indicating the presence of hydroxyl groups, and at 10.5 microns, indicating the P—O—C aromatic linkage, are also obtained.

The entire description of the process for producing such condensation products and the products thus produced, as described in the above Rice, Riley applications, is incorporated herein by reference.

The second component of the adhesive composition of the invention, namely the elastomeric material, is preferably in the nature of a carboxylated butadiene-acrylonitrile rubber, the preparation of which is described in U.S. Patents 2,626,248 and 2,724,707. Such carboxylated copolymers may be formed, for example, by reacting butadiene, acrylonitrile, and acrylic, methacrylic or maleic acid, in proportions of about 55% butadiene, 35% acrylonitrile and 10% of acrylic, methacrylic or maleic acid. See Example 6 of Patent 2,626,248. Hence, the copolymer formed contains free carboxyl groups. The preferred carboxylated butadiene-acrylonitrile elastomers, employed in producing the invention polymers, may have molecular weights in the range of about 100,000 to about 150,000. A preferred material of this type is marketed as Hycar 1072.

However, the invention is not limited to use of the aforementioned specific carboxylated butadiene-acrylonitrile rubbers, and any of the elastomeric conjugated diene polymers containing free carboxyl groups described in Patents 2,626,248 and 2,724,707 may be employed in conjunction with the adduct of phosphonitrilic halide and polyhydroxy aromatic compound. Thus, elastomers produced by polymerization of a mixture of a butadiene such as butadiene-1,3, and an olefinically unsaturated carboxylic acid, e.g. an alpha-beta unsaturated carboxylic acid such as maleic or fumaric acid, to form a carboxylated butadiene copolymer, may be employed.

As above noted, the third component of the adhesive composition of the invention is a cross-linking agent having a reactive group or groups capable of reacting with the free hydroxyls of the aromatic hydroxy groups on the same chain or on different polymeric chains of component (1), or capable of reacting in ortho or para position to such hydroxyls of the aromatic hydroxy groups of component (1). Thus, during the curing stage such cross-linking agent functions to cross-link the chains of component (1) through the resulting divalent residue of the cross-linking agent. As previously noted, the presence of the essential third component or cross-linking agent, together with the two other components in the adhesive composition, substantially improves the strength of the bond formed on curing the adhesive composition, as compared to the strength of bond obtained employing an adhesive containing only the first two components, that is, component (1) and the carboxylated elastomer, in the absence of such cross-linking agent, particularly when such bond is subjected to high temperature.

As previously noted, cross-linking agents which are particularly useful in the invention are aldehydes and polyepoxides.

Among aldehydes which can be employed are included hexamethylenetetramine (a formaldehyde generator), acetaldehyde, isobutyraldehyde, furfural, acrolein, crotonaldehyde, and the like. Specific examples of polyepoxides which can be employed include dicyclopentadiene diepoxide, hydroquinone diglycidyl ether, resorcinol diglycidyl ether, vinyl cyclohexene diepoxide, the diglycidyl ether of bisphenol-A, and various epoxy resins which are glycidyl polyethers of polyhydric phenols. Representative of the latter type of epoxy resins are the materials marketed as Epon Resins 1001, 828 and 1310. Epons 1001 and 828 are condensation products of bisphenol-A with epichlorohydrin. Epon 1310 is a condensation product of a tetrakis hydroxy phenyl compound with epichlorohydrin. Also usable is an epoxy novolac resin marketed as "DEN-438," believed to be a condensation product of a phenol-formaldehyde polymer with epichlorohydrin. Hexamethylenetetramine and dicyclopentadiene diepoxide have been found to be particularly useful cross-linking agents. The latter epoxide has been found especially valuable in providing formulations which produce high strength bonds at elevated temperature. Such cross-linking agents may be employed separately as the third essential component of the adhesive composition, or if desired, a combination of two or more aldehyde and epoxy type cross-linking agents can be employed as third component in the adhesive composition. Thus, for example, a combination of hexamethylenetetramine and dicyclopentadiene diepoxide can be employed as cross-linking agent. Although the use of aldehydes such as hexamethylenetetramine in the invention formulation produces an adhesive bond having high strength at normal temperatures, the use of polyepoxides, particularly dicyclopentadiene diepoxide in the invention composition provides high strength bonds both at normal and elevated temperature.

Although varying proportions of component (1), the carboxylated rubber, and the cross-linking agent can be employed in the adhesive formulations of the invention, it is preferred to employ the three components in certain relative proportions. Thus, for example, it is preferred to employ about 50 to 300%, preferably about 75 to about 150%, of the carboxylated rubber by weight of component (1), and between about 2% to 100%, usually about 2 to about 50% of the cross-linking agent by weight of component (1). In one preferred embodiment, about equal proportions by weight of component (1) and carboxylated rubber are employed. When an aldehyde type cross-linking agent is employed, the amount of this material employed usually is in the lower end of the above-noted 2 to 100% range, and when a polyepoxide is employed as a cross-linking agent, the proportion employed is usually in the intermediate to upper portion of such range. When hexamethylenetetramine is employed as the cross-linking agent it is preferred to employ from about 4% to about 10% thereof by weight of component (1), and when dicyclopentadiene diepoxide is employed as cross-linking agent, it is preferred to employ from about 10% to about 40% thereof by weight of component (1). However, it will be understood that these two specific cross-linking agents can be employed within the above-noted broad range of 2 to 100% by weight of component (1).

The adhesive composition of the invention may be formulated in various ways. Thus, for example, the three above-noted essential components of the composition can be incorporated in a polar solvent such as a ketone, for example, methyl ethyl ketone, methyl isobutyl ketone, or cyclohexanone, an alcohol such as isobutanol, an ester such as propyl acetate, or mixtures of such polar solvents with an aromatic hydrocarbon, e.g. toluene, employing an amount of solvent such that the solution has a solids content of about 5% to about 25% by weight. The solution thus formed is then applied to the surfaces of the metals to be joined together, and the unit is then heated to evaporate the solvent, leaving the essentially dry, uncured adhesive composition between the joined metals. The unit is then cured in a manner described more fully below.

Alternatively, and in preferred practice the adhesive formulation of the invention is blended on a rubber mill. By this procedure, the carboxylated rubber can be broken down on the rubber mill to form a plurality of highly reactive rubber radicals, and the adduct of phosphonitrilic halide and polyhydroxy aromatic compound (component 1), and the cross-linking agent, e.g. dicyclopentadiene diepoxide, are added to the rubber on the mill, causing some partial linking action to take place between the carboxylated rubber and the functional, that is hydroxy, groups of component (1). The composition is then applied to the surfaces of the metals to be joined, and the composition cured by heat in the manner noted in detail below.

According to preferred practice, the carboxylated rubber is first banded on on a cold rubber mill for several minutes; then component (1) and the cross-linking agent, for example, dicyclopentadiene diepoxide, are added over a period of a few minutes, and the mix is cross-blended for several minutes. The mill is then steam-heated for a period, for example, of about a half hour over a temperature range varying from about 110° F. to 260° F. during the blending process. In preferred practice, and particularly for producing an adhesive having high temperature stability, a free radical-producing catalyst is added during the blending of the formulation on the rubber mill. Such catalysts are, for example, organic perepoxides such as ducumyl peroxide, ditertiary butyl peroxide, and methyl ethyl ketone peroxide. Also, if desired, rubber accelerators such as tetramethyl thiuram disulfide and zinc oxide, can be incorporated into the mix during the blending operation on the rubber mill. The amount of free radical-producing catalyst and accelerator employed can each vary generally within the range of about 1 to about 15%, preferably about 2 to about 10%, by weight of the carboxylated elastomer.

At the temperature at which the adhesive composition is blended on the mill, a partial curing of the composition occurs. Following the blending operation on the rubber mill, which lasts for a period of, for example from 45 minutes to 1.5 hours, the adhesive composition in the form of a tacky solid is removed from the mill, usually in the form of a thin film.

In preferred practice for producing a high strength bond, although not necessary, a primer solution of the above described milled adhesive formulation in a polar solvent such as cyclohexanone, methyl ethyl ketone, methyl isobutyl ketone, or mixtures of such polar solvents with an aromatic hydrocarbon, e.g., toluene, can be formed employing about 5% to 25% solids in the solution, and such solution is first applied to the panels or parts to be joined. Then, a film of the partially polymerized tacky adhesive formulation as removed from the mill, with or without calendering, can be applied between the parts to be joined.

When the adhesive composition of the invention is heated to about 275° F., an esterification reaction is believed to occur between the carboxylic groups of the carboxylated rubber and the free hydroxyl groups on the aromatic or phenyl radicals of the phosphonitrilic-polyhydroxy aromatic condensation product (component (1)). This provides an initial cross-linking of component (1). On further heating of the adhesive composition of the invention to temperature in the range of about 300° F. to 400° F., e.g., about 350° F., a further cross-linking is believed to occur between the third essential component of the composition, namely, the above-noted cross-linking agent and component (1). Where an aldehyde or aldehyde generator, such as hexamethylenetetramine is employed as cross-linking agent, a cross-linking is considered to occur between aromatic or phenyl nuclei of the same or adjacent polymeric chains of component (1), through methylene bridges attached in ortho position with respect to the free hydroxy groups on such aromatic or phenyl nuclei. Where a polyepoxide such as dicyclopentadiene diepoxide is employed as the third essential component or cross-linking agent, a reaction is believed to take place between the polyepoxy groups and the hydroxyl groups on the aromatic or phenyl nuclei of the same or adjacent polymeric chains of component (1), in the form of an addition reaction. On further heating of the adhesive composition of the invention to more elevated temperatures of the order of about 500° F., a final cure is obtained. However, this latter heating step is not necessary to obtain a properly cured adhesive bond according to the invention.

It is understood, however, that the invention is not to be taken as limited by the above described theory of curing of the adhesive formulation during heating thereof.

As previously noted, the compositions of the invention are particularly valuable as adhesives which may be employed in the bonding of a large variety of materials, such as metal to metal, metal to other materials such as plastic, wood to wood, glass to glass, glass to metal, and the like. The adhesive compositions hereof are particularly valuable, however, in the bonding of metals such as aluminum to aluminum, and steel to steel. When applied to an adhesive, the compositions may simply be spread on the desired surface to form films of thicknesses, for example, ranging from 5 mils to about 20 mils, and then the other surface superimposed and heat applied. Curing pressures can be light contact pressure or up to as high as 200 pounds per square inch, or greater.

Where the compositions are employed as adhesives for metal to metal bonding, in certain instances it has been found advantageous to coat or impregnate textile material, for example, cotton, rayon, synthetic fiber or glass cloth textiles, with the composition and then employ the impregnated textiles as a bonding tape for joining the metals. Such impregnated tape can be inserted between two metals desired to be joined and the assembly heated and baked to cure the resin to obtain joined surfaces which have high strength at ordinary temperature and which may also retain high strength when heated at relatively elevated temperatures for extended periods of time, particularly when employing polyepoxides as cross-linking agent. When using the metal surfaces coated with adhesive, as described above, if desired, a piece of textile material can be inserted between the coated metal parts before bonding. In addition to their use as adhesives, the compositions of the invention may also be employed as protective coatings and sealants.

The following are examples of practice of the invention. In the examples below the specific component (1), the first essential component of the composition, was prepared as follows:

A reaction flask was charged with 500 grams of a mixture of trimeric and tetrameric phosphonitrilic chlorides containing about 75% trimer and about 25% tetramer by weight, 1188 grams of hydroquinone and 7.5 liters of carbon tetrachloride. This mixture was stirred and heated to reflux and then 854 grams of anhydrous pyridine was added, and refluxing and stirring were continued for a period of about 6 hours. When cool, the carbon tetrachloride was removed by decantation, leaving about 2200 ml. of a thick greenish-yellow oil which was a mixture of the condensation product of phosphonitrilic chloride and hydroquinone, with impurities. This oil was dissolved in 2 liters of a solution consisting of 80% by volume of acetic acid and 20% by volume of water, and the oil-solvent solution introduced in streams into a relatively large volume of flowing water under conditions to precipitate the adduct of phosphonitrilic chloride and hydroquinone in the form of a flocculent solid, which was filtered out of the mixture and dried. This purification and isolation procedure for the phosphonitrilic-hydroquinone condensation product is described in the copending application of Lloyd A. Kaplan, Serial No. 37,466, filed June 20, 1960, now abandoned. Such condensation product is designated as component (1–a) in the examples below.

The adhesive formulations described in the examples below were each tested in shear using aluminum panels made from 2024T3 clad aluminum, 0.064" thick. Prior to bonding, the metal surfaces were solvent-cleaned with methyl ethyl ketone, then immersed for 10 minutes in a solution at 160° F. containing by weight 10 parts of concentrated 98% sulfuric acid, 4 parts of sodium dichromate and 30 parts of water. After rinsing and drying, the panels were assembled with the adhesive and bonded into a ½″ overlap specimen. The specimens were then tested for tensile shear strength at room temperature and at 500° F. The formulations and shear strength data are given in the examples below.

Example 1

A solution of 45 g. of Hycar 1072, 18 g. of component (1–a) and 180 g. of methyl ethyl ketone was prepared. A ¾″ wide, 112-Volan-A glass tape was dipped in this solution, and the coated fabric air dried, re-dipped, air dried, and the process repeated a total of four times. The solution was then diluted with an additional 100 ml. of methyl ethyl ketone, and used as a primer. A pair of aluminum panels were primed with the primer solution and air dried 1.5 hours, then oven dried 30 minutes at 150° F. The above tape as adhesive medium was then placed between the prepared aluminum panels, and the panels bonded by the following cure cycle: Starting with a cold press, heat 1 hour at 350° F., at a pressure of 150 to 220 p.s.i.; post-cure 1 hour at 500° F. Lap-shear strength: room temperature 1185 p.s.i.; 500° F., 231 p.s.i.

Example 2

Two hundred g. of Hycar 1072 was banded on a cold rubber mill and broken down for about 3 minutes on the mill. To this was added 200 g. of component (1–a) continuously over 2 to 3 minutes. The mix was cross-blended approximately 5 minutes without external heating, then the mill was steam-heated. Milling was continued for ½ hour, the temperature of the mill rollers being 235–255° F. The mixture was then calendered off of the mill in a thin film which was used as an adhesive layer between a pair of aluminum panels which were bonded according to the following cure cycle: Starting with a hot press, heat 2 hours at 350° F. under a pressure of 200 p.s.i.; post-cure 1 hour at 500° F., with slow heat-up and cool-down. Lap shear strength: room temperature 1333 p.s.i.; 500° F., 115 p.s.i.

Example 3

Two hundred g. of Hycar 1072 was milled on a cold rubber mill approximately 2 minutes. Then 180 g. of component (1–a) was added to the rubber mill in a period of approximately 5 minutes. Then 1 g. of stearic acid, 10 g. of zinc oxide, 1 g. of sulfur was added, in that order, and the mix milled 3 to 5 minutes. Then 6 g. of tetramethylthiuram disulfide was added, the mix milled about 2 minutes, then 4 g. of hexamethylenetetramine was added, the mix milled 2 to 5 minutes, then calendered off the mill as a thin film and used to bond a pair of aluminum panels according to the following cure cycle: Starting with a hot press, heat 2 hours at 350° F. under a pressure of 100 p.s.i., post-cure 1 hour at 500° F. with slow heat-up and cool-down. Lap-shear strength: room temperature 1740; 500° F., 218 p.s.i.

Example 4

Two hundred g. of Hycar 1072 was banded on a cold rubber mill for approximately 3 minutes. Two hundred g. of component (1–a) was added continuously in 2 to 3 minutes. Then 25 g. of dicyclopentadiene diepoxide was added, and the mix cross-blended approximately 5 minutes. The mill was then steam heated for approximately ½ hour, during which time the mill rollers increased in temperature to approximately 150° F. Five g. of dicumyl peroxide was added and the milling was continued another 30 minutes with steam heating, such that the temperature of the mill rollers increased to approximately 206° F. The mixture was taken off the mill, the mixture and the mill cooled, then the mixture again banded on the cold rubber mill. The stock was cross-blended approximately 5 minutes, then taken off and cooled again. It was returned to a cold rubber mill, cross-blended approximately 1 minute, and calendered off in the form of a thin film. A primer solution was prepared from the above adhesive formulation, as a mixture of 20% toluene, 30% cyclohexanone, and 50% methyl isobutyl ketone containing 10% solids of the above adhesive formulations. This primer was used to prime aluminum panels. These panels were then bonded using the film adhesive of the above adhesive formulation, by the following cure cycle: Starting with a cold press, heat 2 hours at 350° F. under 150 p.s.i. pressure. Lap-shear results: room temperature 2497 p.s.i.; room temperature after 100 hours at 500° F., 2557 p.s.i.; strength at 500° F. after 100 hours at 500° F., 1524 p.s.i.

It will be seen that comparing the results of shear strength of the bond of Examples 3 and 4 produced by the adhesive compositions of the invention, with the shear strength of the bonds produced in Examples 1 and 2 above, employing only a two-component formulation of component (1) and carboxylated rubber, the shear strengths of the bonds of Examples 3 and 4 according to the invention at room temperature, and the shear strength of the bond of Example 4, employing a polyepoxide at elevated temperature of 500° F., are substantially greater than the shear strength of the bonds of Examples 1 and 2 not containing the third essential component of the invention.

Example 5

The following adhesive formulation was produced:

|  | G. |
|---|---|
| Hycar 1072 | 200 |
| Component (1–a) | 200 |
| Dicyclopentadiene diepoxide | 75 |
| Dicumyl peroxide | 5 |

The rubber was banded on the rubber mill in a manner similar to that described in Example 4 above, and the component (1–a) added as noted in Example 4. The dicyclopentadiene diepoxide was added in about 8 minutes and the mix cross-blended for about 5 minutes. During the blending the rubber mill was heated by steam to temperature varying from about 90° F. to 180° F. over a period of about 15 minutes, after which the mix was cross-blended another 5 minutes and calendered off the mill.

Lap-shear specimen plates of 17–7 PH stainless steel were cleaned and bonded as follows: The panels were solvent wiped with acetone and immersed 5 minutes at room temperature in a "Bright Dip" made up of 1 part concentrated HCl, 1 part concentrated nitric acid, 1 part concentrated phosphoric acid; panels were then rinsed in distilled water and bonded by means of the above adhesive formulation according to the following cure cycle: Starting with a hot press, bonded at 350° F. under a pressure of 100 p.s.i. 1 hour, then increase temperature to 500° F. and heat 1 hour at 100 p.s.i. Cool the press to 200° F., and remove the specimens, and test under tensile shear at room temperature. The lap shear strength of the bond at room temperature thus produced, based on an average of three lap shear specimens, was about 3200 pounds per square inch.

Example 6

The following adhesive formulation was prepared:

|  | G. |
|---|---|
| Hycar 1072 | 200 |
| Component (1–a) | 200 |
| Dicyclopentadiene diepoxide | 25 |
| Hexamethylenetetramine | 10 |

The carboxylated rubber was banded on a rubber mill, and component (1–a) added as described in Example 4 above. The dicyclopentadiene diepoxide was added in about 5 minutes, and the mix was cross blended for an additional 5 minutes. Then steam was applied to the mill, the mix being blended on the mill at temperatures of about 130° F. to about 225° F., for a period of about 15 minutes. The mix was then cross-blended for an additional 5 minutes and calendered off. Such mix was applied as described above to 17-7 PH stainless steel lap shear specimens cleaned as decribed in Example 5 above, and the bonded panels cured according to the cure cycle of Example 5. The lap shear strength at room temperature of such specimens based on an average of three lap shear specimens was about 3700 p.s.i.

*Example 7*

The procedure of Example 4 is repeated employing in place of component (1–a) formed from a mixture of trimeric and tetrameric phosphonitrilic chloride, the same resin formed using trimeric phosphonitrilic chloride alone. Shear strength results similar to those of Example 4 are obtainable.

*Example 8*

The procedure of Example 4 is repeated except that in place of component (1–a) of Example 4 the following phosphonitrilic chloride-polyhydroxy aromatic condensation products are employed:

(1) Mixture of phosphonitrilic chlorides (75% trimer and 25% tetramer) and phloroglucinol
(2) Mixture of phosphonitrilic chlorides (75% trimer and 25% tetramer) and pyrogallol
(3) Mixture of phosphonitrilic chlorides (75% trimer and 25% tetramer) and catechol
(4) Mixture of phosphonitrilic chlorides (75% trimer and 25% tetramer) and resorcinol
(5) Phosphonitrilic chloride trimer and hydroquinone
(6) Phosphonitrilic chloride tetramer and hydroquinone
(7) Phosphonitrilic chloride trimer and catechol
(8) Phosphonitrilic chloride tetramer and pyrogallol In each case shear strength results similar to those of Example 4 are obtainable.

*Example 9*

The procedure of Example 4 is repeated, but in place of the carboxylated rubber, Hycar 1072, noted therein, a copolymer of butadiene-1,3 and maleic acid is employed. Shear strength results similar to those of Example 5 are obtainable.

*Example 10*

The procedure of Example 4 is repeated, except employing in place of dicyclopentadiene diepoxide, the following poly epoxides: (1) resorcinol diglycidyl ether, (2) vinylcyclohexene diepoxide, (3) Epon 1001, and (4) Epon 1310. In each of the above cases shear strength results similar to those obtained in Example 5 are obtainable.

*Example 11*

The procedure of Example 4 is repeated employing respectively the following formulations in place of that of Example 4:

(a)

| | G. |
|---|---|
| Hycar 1072 | 150 |
| Component (1–a) | 200 |
| Dicyclopentadiene diepoxide | 45 |
| Dicumyl peroxide | 5 |

(b)

| | |
|---|---|
| Hycar 1072 | 300 |
| Component (1–a) | 200 |
| Dicyclopentadiene diepoxide | 65 |
| Dicumyl peroxide | 15 |

In both cases shear strength results similar to Example 4 are obtainable.

From the foregoing, it is seen that the invention provides adhesive compositions having particularly valuable application for bonding metal to metal, especially aluminum to aluminum, as well as other useful applications.

While we have described particular embodiments of our invention for the purpose of illustration, it should be understood that various modifications and adaptations thereof may be made within the spirit of the invention as set forth in the appended claims.

We claim:
1. An adhesive composition comprising a mixture of
   (a) a condensation product in the form of a mixture of compounds including chains of cyclic PN containing rings, the rings being linked together by aromatic dioxy radicals through the phosphorous atoms on said cyclic PN containing rings, which mixture corresponds to a constitutional formula

$$(P_xN_x)_nCl_m(OBO)_q(OBOH)_p$$

where B is a divalent aromatic radical, $x$ is in the range of 3 to about 11, $n$ has a value of at least 2, $m$ ranges from 0 to about 60, $p$ is at least 1, and $q$ is related to $n$, $m$ and $p$ such that $$q = nx - \frac{(m-p)}{2}$$

said mixture having a very strong infrared absorption in a region of about 11 to about 11.5 microns wave length, characteristic of the PN ring absorption region in the infrared absorption spectrum of trimeric polyphosphonitrilic chloride, said condensation product containing not more than 10% by weight of chlorine,
   (b) from about 50% to 300% by weight of said condensation product of an elastomeric conjugated diene polymer containing free carboxyl groups, and
   (c) about 2% to about 100% by weight of said condensation product of a cross-linking agent having at least one function group reactive with the aromatic hydroxy groups in said condensation product, to thereby cross link said condensation product, said cross-linking agent selected from the group consisting of polyglycidyl ethers of polyhydric phenols, dicyclopentadiene dioxide, vinyl cyclohexene dioxide and the condensation products of epichlorohydrin and a novolak.
2. An adhesive composition comprising a mixture of
   (a) a condensation product in the form of a mixture of compounds comprising chains containing at least two cyclic rings consisting of from 3–11 PN groups, each pair of adjacent rings being linked together through adjacent phosphorus atoms on said adjacent rings by at least one aromatic dioxy radical, said condensation product also containing aromatic oxy radicals containing free hydroxyl groups and from 0 to about 10% by weight of chlorine,
   (b) from about 50% to 300% by weight of said condensation product of an elastomeric conjugated diene polymer containing free carboxyl groups, and
   (c) about 2% to about 100% by weight of said condensation product of a cross-linking agent reactive with the aromatic hydroxy groups in said condensation product, to thereby cross link said condensation product, said cross-linking agent selected from the group consisting of polyglycidyl ethers of polyhydric phenols, dicyclopentadiene dioxide, vinyl cyclohexene dioxide and the condensation products of epichlorohydrin and a novolak.
3. An adhesive composition as defined in claim 1, wherein component (b) is a copolymer of a butadiene and an unsaturated carboxylic acid.
4. An adhesive composition as defined in claim 1, wherein component (b) is a carboxylated butadieneacrylonitrile rubber.
5. An adhesive composition as defined in claim 1, wherein component (b) is a carboxylated butadieneacrylonitrile rubber, and component (c) is dicyclopentadiene diepoxide.
6. An adhesive composition as defined in claim 1, and including about 1% to about 15% by weight of said elastomeric polymer of a free radical-producing catalyst in the form of an organic peroxide of the group consisting of ditertiary butyl peroxide, and methyl ethyl ketone peroxide.

7. An adhesive composition as defined in claim 1, wherein B in component (a) is a phenylene radical, said component (a) containing about 0.1 to about 10% chlorine and a hydroxyl content of about 1 to about 20%, by weight of component (a), and having an average molecular weight between about 1,000 and about 20,000, component (b) having a molecular weight in the range of above 100,000 to about 150,000.

8. An adhesive composition as defined in claim 7, wherein component (b) is a carboxylated butadiene-acrylonitrile rubber, and component (c) is dicyclopentadiene diepoxide.

9. An adhesive composition as defined in claim 1, wherein B in component (a) is a phenylene radical, said component (a) containing about 0.1 to about 5% chlorine and a hydroxyl content of about 3% to about 10%, by weight of component (a), and having an average molecular weight of between about 3,000 and about 8,000, and wherein component (b) has a molecular weight in the range of above 100,000 to about 150,000.

10. An adhesive composition as defined in claim 9, wherein component (b) is a carboxylated butadiene-acrylonitrile rubber, and component (c) is dicyclopentadiene diepoxide.

11. The process which comprises blending on a rubber mill a mixture of an adhesive composition as defined in claim 1 at elevated temperature of about 110° to about 260° F., and continuing said blending for a period sufficient to produce partial curing of said mixture, and removing the resulting material from said mill in the form of a tacky solid.

12. A solution in an organic solvent of an adhesive composition as defined in claim 1, said solution containing from about 5% to about 25% by weight of said composition.

13. An article of manufacture comprising a pair of metal parts bonded together by an adhesive composition as defined in claim 1.

14. An adhesive composition comprising a blended mixture of (a) a condensation product comprising essentially a mixture of compounds, there being present in said compounds linkages of the type

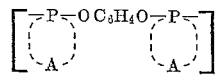

wherein A represents the atoms necessary to complete a lower cyclic PN ring consisting of 3–11 PN groups, and wherein said compounds of the mixture contain substituents on the phosphorus taken from the group consisting of —Cl and —$C_6H_4OH$ groups, the average chlorine content of said compounds being less than about 10% by weight of the mixture, and the average hydroxyl content being less than about 12% by weight of the mixture, (b) from about 50% to 300% by weight of said condensation product of an elastomeric conjugated diene polymer containing free carboxyl groups, and (c) about 2% to about 100% by weight of said condensation product of a cross-linking agent selected from the group consisting of aldehydes and hexamethylenetetramine reactive with a position on the condensation product selected from the group consisting of the positions ortho and para to said hydroxyls, to thereby cross link said condensation product.

15. An adhesive composition as defined in claim 14, wherein component (c) is hexamethylenetetramine.

16. An adhesive composition as defined in claim 14, wherein component (b) is a carboxylated butadiene-acrylonitrile rubber, and component (c) is hexamethylenetetramine.

References Cited by the Examiner
UNITED STATES PATENTS 3,108,989   10/1963   Rice et al. _____ 260—887

SAMUEL H. BLECH, *Primary Examiner.*
MURRAY TILLMAN, *Examiner.*